United States Patent
Bengtsson et al.

(10) Patent No.: US 11,977,143 B2
(45) Date of Patent: May 7, 2024

(54) RADAR PROBING USING RADIO COMMUNICATION TERMINALS

(71) Applicant: SONY GROUP CORPORATION, Tokyo (JP)

(72) Inventors: Erik Bengtsson, Eslöv (SE); Rickard Ljung, Helsingborg (SE); Fredrik Rusek, Eslöv (SE); Olof Zander, Södra Sandby (SE); Zhinong Ying, Lund (SE)

(73) Assignee: Sony Group Corporation, Tokyo (JP)

( * ) Notice: Subject to any disclaimer, the term of this patent is extended or adjusted under 35 U.S.C. 154(b) by 216 days.

(21) Appl. No.: 17/436,366

(22) PCT Filed: Mar. 11, 2020

(86) PCT No.: PCT/EP2020/056552
§ 371 (c)(1),
(2) Date: Sep. 3, 2021

(87) PCT Pub. No.: WO2020/216522
PCT Pub. Date: Oct. 29, 2020

(65) Prior Publication Data
US 2022/0163651 A1    May 26, 2022

(30) Foreign Application Priority Data

Apr. 26, 2019  (SE) .................................. 1950506-4

(51) Int. Cl.
*G01S 13/12*   (2006.01)
*G01S 7/292*   (2006.01)

(52) U.S. Cl.
CPC ............ *G01S 13/12* (2013.01); *G01S 7/2921* (2013.01)

(58) Field of Classification Search
CPC .............................. G01S 13/12; G01S 7/2921
See application file for complete search history.

(56) References Cited

U.S. PATENT DOCUMENTS 10,109,168 B1 * 10/2018 Devison ............. G08B 13/2491
2016/0293781 A1   10/2016 Fan
(Continued)

FOREIGN PATENT DOCUMENTS

| CN | 106686202 A | 5/2017 |
| CN | 107770731 A | 3/2018 |

(Continued)

OTHER PUBLICATIONS

International Search Report and Written Opinion from corresponding International Application No. PCT/EP2020/056552, dated Jun. 1, 2020, 10 pages.
(Continued)

*Primary Examiner* — Bernarr E Gregory
*Assistant Examiner* — Hailey R Le
(74) *Attorney, Agent, or Firm* — Tucker Ellis LLP

(57) ABSTRACT

A radio communication terminal (UE2) configured to act as a radar receiver, comprising: —a radio transceiver (323), —logic (320) configured to communicate data, via the radio transceiver, on a radio channel (101), wherein the logic is further configured to obtain (233), via the radio transceiver, a radar probing request (230) to detect radio signal echoes; determine (235) a receive direction (Dir2) based on the request; control the radio transceiver to detect (242) a receive property of the radio signal echoes in said direction; and transmit (261), via the radio transceiver, data (260) associated with the detected receive property to a radio communication device (BS1, UE1).

15 Claims, 5 Drawing Sheets

(56) References Cited

U.S. PATENT DOCUMENTS

| | | |
|---|---|---|
| 2016/0377703 A1 | 12/2016 | Pais |
| 2017/0134964 A1 | 5/2017 | Yu |
| 2019/0056488 A1 | 2/2019 | Vacanti |
| 2019/0200339 A1 | 6/2019 | Handte |
| 2019/0253900 A1* | 8/2019 | Narasimha ............ H04W 4/025 |
| 2020/0145079 A1* | 5/2020 | Marinier ........... H04W 56/0045 |

FOREIGN PATENT DOCUMENTS

| | | | |
|---|---|---|---|
| CN | 109477886 A | 3/2019 | |
| WO | WO-2017207042 A1 * | 12/2017 | ............. G01S 13/86 |

OTHER PUBLICATIONS

Swedish Office Action and Search Report from corresponding Swedish Application No. 1950506-4, dated Dec. 2, 2019, 9 pages.

Reiner S. Thoma et al., "Cooperative Passive Coherent Location: A Promising 5G Service to Support Road Safety," IEEE, arXiv:1802.04041v8 [eess.SP], Oct. 1, 2019, 7 pages.

P. Samczynski et al., "A Concept of GSM-based Passive Radar for Vehicle Traffic Monitoring," IEEE Mirowaves, Radar and Remote Sensing Symposium, Aug. 25-27, 2011, 4 pages.

* cited by examiner

RADAR PROBING USING RADIO COMMUNICATION TERMINALS

TECHNICAL FIELD

This disclosure relates to the concept of using terminals of a radio communication system to act as entities in radar probing. Specifically, solutions are provided for configuring different terminals to act as radar pule transmitter and radar pulse receiver, under control by a radio device which indicates a direction or location of probing.

BACKGROUND

For achieving higher data bandwidth, the spectrum used for communication on radio channels is expected to move to higher frequencies, e.g., to frequencies beyond 6 or 10 GHz. At such frequencies, radar probing is feasible. This is due to the well-defined spatial transmission characteristics of electromagnetic waves in the respective spectrum.

In radar probing using a unitary radar device, a radar receiver measures properties of radio frequency echoes from signals or pulses transmitted by a radar transmitter. Based on the received signal properties, and of the transmitted signal, calculations may be made to compute relative distances to, and velocities of, reflecting objects. If the radar device knows its position, velocity, and orientation, it is possible to compute the absolute position and velocity also for the reflecting object.

The performance could be significantly improved if the echoes are analyzed by multiple receivers. It is also feasible to physically separate the radar transmitter and the radar receiver. The radar receiver will then act as a so-called passive radar, in the sense that it is not in itself involved in the transmission of the radar pule.

General features associated with using radio communication network entities for passive radar sensing are presented in a study entitled "Cooperative Passive Coherent Location: A Promising 5G Service to Support Road Safety", Reiner S. Thomä et al., https://arxiv.org/pdf/1802.04041.pdf.

However, the strategy of using radio communication devices as entities in radar sensing brings about challenges for system design, specifically related to identifying suitable transmit and receive beams for the involved UEs, and to achieve synchronization between the devices. An associated problem is how to configure a system and its devices, which are adapted for telecommunication, to conveniently and efficiently cooperate for radar sensing.

SUMMARY

Therefore, a need exists for techniques of coexistence of data communication and radar probing. In particular, a need exists for techniques which govern identification and use of terminals in a radio communication system in a coordinated manner for radar probing.

This need is met by the features of the independent claims. The features of the dependent claims define embodiments.

According to an example, a radio communication terminal is provided, configured to act as a radar receiver. The terminal comprises a radio transceiver, and logic configured to communicate data, via the radio transceiver, on a radio channel. The logic is further configured to
 obtain, via the radio transceiver, a radar probing request to
  detect radio signal echoes;
 determine a receive direction based on the request;
 control the radio transceiver to detect a receive property
  of the radio signals echoes in said direction; and
 transmit, via the radio transceiver, data associated with the
  detected receive property to a radio communication
  device.

By means of this configuration, the radio communication terminal may be instructed to cooperate as a receiver in passive radar probing. Moreover, by being able to determine a receive direction based on the request, the terminal may suitably be configured to sense for echoes in the identified receive direction by arranging an antenna device for selected spatial sensing in that direction.

According to another example, a radio communication device is provided for controlling passive radar probing. The radio communication device, which may include a radio base station in a radio communication network, comprises a radio transceiver and logic configured to communicate data via the radio transceiver. The logic is configured to
 transmit, via the radio transceiver, a radar probing request,
  wherein said radar probing request includes an identification of a location for radar probing;
 determine a transmit property of a radar pulse transmitted
  by a first radio communication terminal acting as radar
  transmitter;
 receive, via the radio transceiver, data associated with a
  receive property detected in at least one second radio
  communication terminal acting as radar receiver for
  receiving the radar pulse;
 obtain position information associated with the radar
  transmitter and the radar receiver;
 determine a spatial property of an object in said location
  based on the transmit property, the receive property and
  the obtained position information.

By means of this configuration, the radio communication device may control terminals to act as transmitter and receiver, respectively, in passive radar probing. Moreover, by informing the terminals of a location for probing, the terminals are provided with information for being suitably configured to transmit radar pulse and/or sense for echoes in the most appropriate direction.

The examples described above, and the examples described hereinafter, may be combined with each other and further examples.

DETAILED DESCRIPTION

Figure 1:
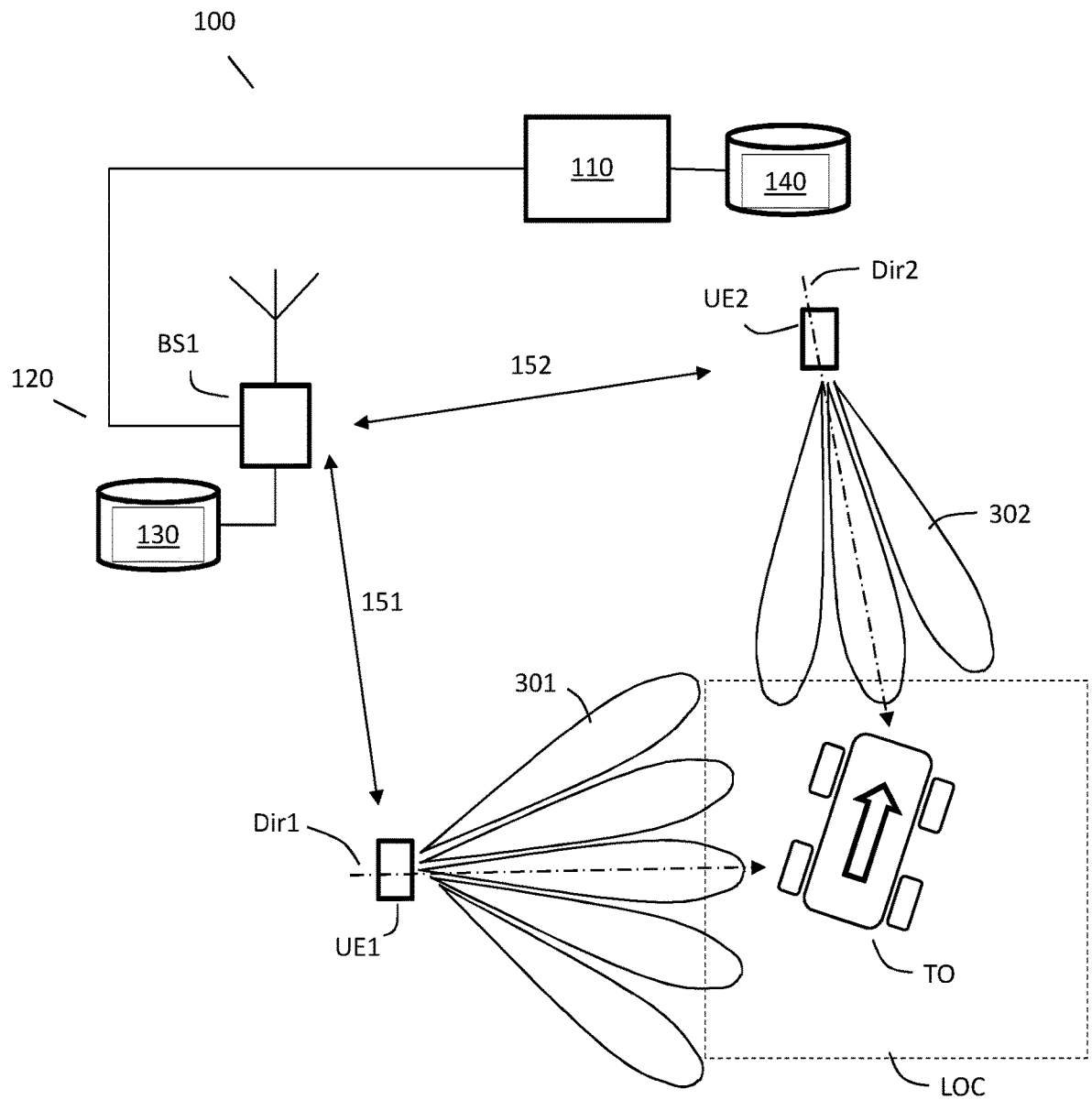
FIG. 1 schematically illustrates a scenario of passive radar probing using terminals of a radio communication network according to various embodiments.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of coexistence of data communication and radar probing on a radio channel are described, using nodes of a radio communication network. Radar probing can be used for a variety of cases, include for example positioning aid, traffic detection, drone landing assistance, obstacle detection, security detection, photography features, etc.

To facilitate the coexistence, one or more resource mappings may be employed to coordinate and distribute resource-usage between the data communication and the radar probing. The one or more resource mappings may define resource elements with respect to one or more of the following: frequency dimension; time dimension; spatial dimension; and code dimension. Sometimes, the resource elements are also referred to as resource blocks. Resource elements may thus have a well-defined duration in time domain and/or bandwidth in frequency domain. The resource elements may be, alternatively or additionally, defined with respect to a certain coding and/or modulation scheme. A given resource mapping may be defined with respect to a certain spatial application area or cell.

In some examples, resource elements of the resource mapping are employed for the data communication and the radar probing, respectively, which are orthogonal to each other. Here, orthogonality of resource elements may correspond to the resource elements differing from each other with respect to one or more of the following: frequency dimension; time dimension; spatial dimension; and code dimension. Sometimes, these cases are referred to frequency division duplexing (FDD), time division duplexing (TDD), spatial division duplexing; and code division duplexing (CDD). By employing orthogonal resource elements for the data communication on the one hand side and the radar probing on the other hand side, interference between the data communication and the radar probing can be mitigated. Furthermore, it becomes possible to employ one and the same hardware, e.g., a handheld device or a radio base station to perform, both, data communication and radar probing. By employing the radar probing in the context of a device configured for data communication, functionality of that device can be greatly enhanced. Example scenarios of coexistence between radar probing and data communication, including signaling between a radio communication terminal, also referred to as terminal for short herein, and a radio base station, as well as application of radio resources, will be described further below with reference to FIGS. 6 and 7.

FIG. 1 illustrates a high-level perspective of radar probing in a radio communication network 100 according to various embodiments outlined herein. The radio communication network 100 may comprise a core network 110 and one or more base stations, of which one base station BS1 is illustrated. The base station BS1 is configured for wireless communication 751, 752 with various terminals, of which a first terminal UE1 and a second terminal UE2 are shown. Such terminals may be selected from the group comprising: handheld device; mobile device; robotic device; smartphone; laptop; drone; tablet computer; wearable devices etc.

Wireless communication may include data communication defined with respect to a radio access technology (RAT). While with respect to FIG. 1 and the following Figs, various examples are provided with respect to a cellular network, in other examples, respective techniques may be readily applied to point-to-point networks. Examples of cellular networks include the Third Generation Partnership Project (3GPP)—defined networks such as 3G, 4G and upcoming 5G. Technology-wise, the network may for example use a WCDMA, LTE or New Radio access protocol. Examples of point-to-point networks include Institute of Electrical and Electronics Engineers (IEEE)—defined networks such as the 802.11x Wi-Fi protocol or the Bluetooth protocol. As can be seen, various RATs can be employed according to various examples.

The base station BS1 forms part of a radio device 120, which may further include a computation device or server 130 for performing calculations and storing data based on signals and data received and transmitted using the base station BS1. In various examples, the computation device 130 may be an edge computing server, which may be configured to operate as a Mobile Edge Computing (MEC) host.

The scenario of FIG. 1 is based on the notion that there is an interest of knowing physical properties about an object, herein also referred to as a target object (TO). It should be understood that the underlying objective does not necessarily have be directed to the target objective TO, but to obtaining information of presence or activity in a certain location area (LOC), in which an object may currently be located. The interest of obtaining knowledge of the physical properties about the target object TO may originate from a terminal, e.g. UE1, or from other entities of the system, e.g. presence detectors, an operator, a default schedule, etc.

To obtain knowledge of the physical properties about the target object TO, passive radar probing is carried out, in which terminal UE1 is configured to act as a radar transmitter to transmit radio signals as radar probing pulses, and wherein UE2 is configured to act as a radar receiver to detect echoes of such radio signals. The received echoes may subsequently be processed in order to obtain the physical properties about the target object TO, such as location, shape, velocity etc. In FIG. 1, only two terminals are shown. However, based on a transmitted radio signal from one UE, received by multiple UEs, improved accuracy can be obtained.

In the proposed solution, one terminal UE1 is identified as the transmitting terminal. The transmission in this context means that UE1 is configured to transmit a predefined signal shape, e.g. a pilot or a beam sweep of pilots, that can be used for radar operation. UE1 may be identified by the base station BS1 of the radio device 120 in the network 100 as a suitable device to be the transmitting terminal. The identification of UE1 as suitable may be conducted by means of selecting the terminal UE1 based on information known by the base station, e.g. camping within a given network cell of base station BS1 or being active in communication with the base station BS1 using a certain beam direction. The UE1 may thus be
- any of the UEs in the system,
- limited to a UE that initiated/requested the measurement procedure or
- multiple UEs that "one by one" perform transmission.

For the transmission of the predefined radio signal to be used as a radar pulse the UE1 may have information of direction Dir1 for the transmission and/or approximate location LOC of the item TO to measure, i.e. a geometric definition. The geometric definition may originate from the terminal UE1 or from another entity and conveyed to the terminal UE1 by the base station BS1.

At least a second terminal UE2, and possibly multiple UEs, potentially also including UE1, are then requested to listen for the signal transmitted by UE1 to detect echoes of the transmitted radio signal. This may be obtained by performing beam sweeps in a direction Dir 2 defined by the geometric definition. Feedback properties of the received signal echoes are then provided to the system, either directly to the radio device 120 or to the transmitter terminal UE1. The signal properties may include time of arrival, direction of arrival, power level etc. of the signal. All information regarding the receive properties are then processed either by the system, such as in the radio device 120 or a node 140 in the core network, or in the requesting terminal UE1.

Figure 6:
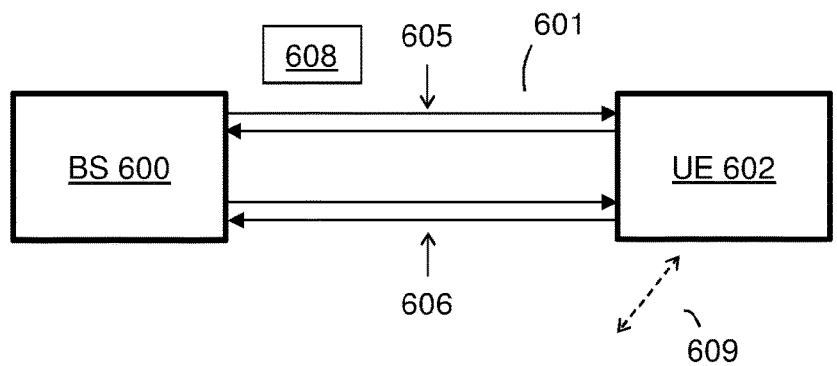
FIG. 6 schematically illustrates coexistence of data communication and radar probing according to various embodiments.

Now referring to FIG. 6, an example scenario of coexistence between radar probing 609 and data communication 608—such as packetized data communication—is depicted. Here, the base station BS 600 of e.g. a cellular network 100 implements the data communication 608 with the terminal UE 602 attached to the cellular network 100 via a radio channel 601. The base station 600 may e.g. correspond to base station BS1 of FIG. 1. Terminal 602 may correspond to any of terminals UE1 or UE 2 of FIG. 1, wherein the communication between the base station 600 and the terminal 602 may correspond to the communication 751 or 752, respectively.

Communicating data may comprise transmitting data and/or receiving data. In the example of FIG. 6, the data communication 608 is illustrated as bidirectional, i.e. comprising uplink (UL) communication and downlink (DL) communication. The data communication 608 may be defined with respect to a RAT, comprising a transmission protocol stack in layer structure. E.g., the transmission protocol stack may comprise a physical layer (Layer 1), a datalink layer (Layer 2), etc. Here, a set of rules may be defined with respect to the various layers which rules facilitate the data communication. E.g., the Layer 1 may define transmission blocks for the data communication 608 and pilot signals. The data communication 608 is supported by, both, the BS 600, as well as the terminal 602. The data communication 608 employs a shared channel 605 implemented on the radio channel 601. The shared channel 606 comprises an UL shared channel and a DL shared channel. The data communication 608 may be used in order to perform uplink and/or downlink communication of application-layer user data between the BS 600 and the terminal 602. As illustrated in FIG. 6, furthermore, a control channel 606 is implemented on the radio channel 601. Also, the control channel 606 is bidirectional and comprises an UL control channel and a DL control channel. The control channel 606 can be employed to implement communication of control messages. E.g., the control messages can allow to set up transmission properties of the radio channel 601.

Both, performance of the shared channel 605, as well as performance of the control channel 606 are monitored based on pilot signals. The pilot signals, sometimes also referred to as reference signals or sounding signals, can be used in order to determine the transmission characteristics of the radio channel 601. In detail, the pilot signals can be employed in order to perform at least one of channel sensing and link adaptation. Channel sensing can enable determining the transmission characteristics such as likelihood of data loss, bit error rate, multipath errors, etc. of the radio channel 601. Link adaptation can comprise setting transmission properties of the radio channel 601 such as modulation scheme, bit loading, coding scheme, etc. The pilot signals may be cell-specific.

The radar probing 609 can be used in order to determine the position and/or velocity of passive objects in the vicinity of the terminal 602. It is possible that the position of the passive objects TO is determined in terms of a distance to the radar transmitter. Alternatively, or additionally, it is possible that the position is more accurately determined, e.g., with respect to a reference frame. Radial and/or tangential velocity may be determined. For this, one or more receive properties of echoes of the radar probe pulses can be employed as part of the radar probing. Echoes are typically not transmitted along a straight line, hereinafter for simplicity referred to as non line-of-sight (LOS), but affected by reflection at the surface of an object. The receive properties may be locally processed at the radar receiver; and/or may be provided to a further entity such as the radar transmitter for processing to yield the position and/or the velocity.

The radar transmitter, which is realized by configuration of radio communication terminal UE1, is configured to transmit radar probe pulses. Likewise, the radar receiver, which is realized by configuration of radio communication terminal UE2, is configured to receive echoes of radar probe pulses reflected from passive objects. In an example, radar probe pulses are thus transmitted by the terminal UE1 and corresponding echoes are received by the terminal UE2, and possibly also by further terminals, and possibly by the terminal UE1.

Figure 7:
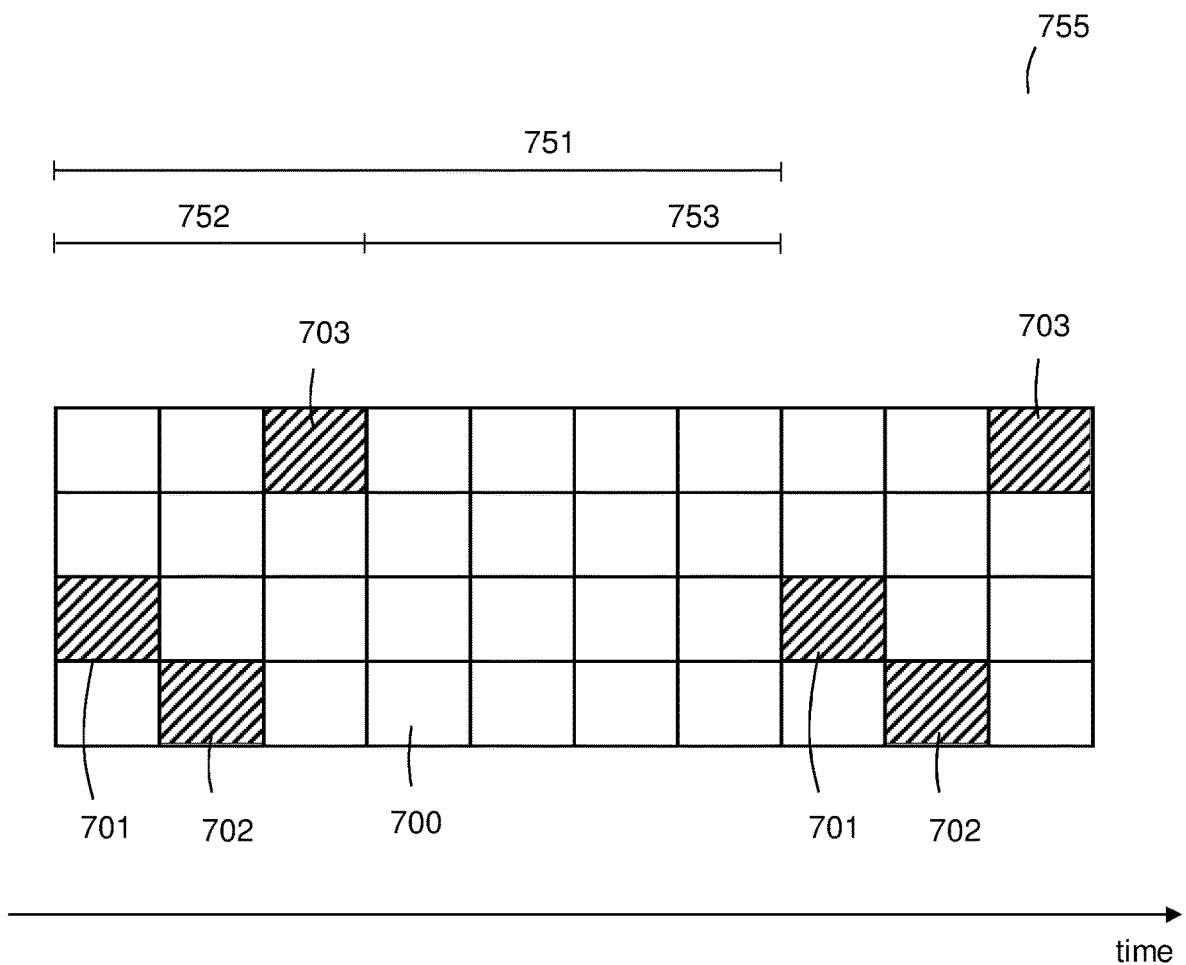
FIG. 7 schematically illustrates resource mapping of a radio channel employed for the data communication according to various embodiments, the resource mapping comprising first resource elements employed for the data communication and second resource elements employed for the radar probing.

FIG. 7 illustrates aspects with respect to the resource mapping 755. As illustrated in FIG. 7, the resource mapping 755 is defined in frequency domain (vertical axis in FIG. 7) and time domain (horizontal axis in FIG. 7). The rectangular blocks in FIG. 7 illustrates different resource elements. First resource elements 700 are used for data communication. Second resource elements 701-703 are used for radar probing 109. As illustrated in FIG. 7, FDD and TDD techniques are employed to ensure that the first resource elements 700 and the second resource elements 701-703 are orthogonal with respect to each other. Data transmission 108 is muted, i.e., turned off or suppressed, during the second resource elements 701-703. By designing the first resource elements 700 and the second resource elements 701-703 to be orthogonal with respect to each other, interference between the data communication 108 in the first resource elements 700 and the radar probing 109 in the second resource elements 701-703 can be mitigated. By muting the data communication 109 in the second resource elements 701-703, degraded transmission reliability of the data communication 109 can be avoided.

In the example of FIG. 7, the resource elements 701-703 have a comparably limited frequency bandwidth. In some examples, it is possible to implement the radar probing 109 covering multiple resource elements 701-703 of the resource mapping 755 which hare adjacent to each other in frequency domain. It is possible that the full frequency bandwidth of the resource mapping 755 is dedicated to radar probing 109. Illustrated in FIG. 7 is an example where the second resource elements 701-703 are arranged in an intermittent sequence. A repetition period 751 of the sequence of second resource elements 701-703 comprises a time duration 752 during which the second resource elements 701-703 are allocated in order to facilitate the radar probing 109; and further comprises a time duration 753 during which the second resource elements 701-703 are not present or muted (in FIG. 7 for sake of simplicity only a single repetition of the sequence of second resource elements 701-703 is fully depicted).

In one example, the average repetition period of individual elements of the sequence of the second resource elements, e.g., the repetition period 751 is larger than 0.5 seconds, preferably larger than 0.8 seconds. By such a repetition period, a sufficiently large time resolution can be provided for the radar probing 109 on the one hand side; while throughput of the data communication 108 is not unduly reduced. In order to facilitate efficient radar probing 109, the duration 752 of individual elements of the sequence of the second resource elements 701-703 is typically shorter than 2 microsecond, preferably shorter than 0.8 microseconds, more preferably shorter than 0.1 microsecond. Thereby, significant snapshots of the position/velocity of the passive objects in the surrounding of the devices 112, 130 can be obtained; at the same time, resources are not unduly occupied. Considering a scenario where the distance is d=50 m, the time of flight for a radar probe pulse amounts to $2*d/c=100/(3*10^8)=0.33$ μs, where c is the speed of light. By dimensioning the second resource elements 701-703 to include multiple radar probe pulses, scanning is possible.

In some examples, it is possible that the duration of the resource elements 701-703 used for radar probing is different from the duration of the resource elements 700 used for data transmission. Generally, the time-frequency shape of the resource elements 701-703 may be different from the shape of the resource elements 700. Generally, the techniques described herein are not limited to a particular spectrum or band. E.g., the spectrum occupied by the resource mapping 755 may be a licensed band or an unlicensed band. Typically, in an unlicensed band un-registered devices can gain access. Sometimes, in a licensed band a repository may keep track of all eligible subscribers; differently in an unlicensed band such a database of eligible subscribers may not exist. Different operators may access the unlicensed band. E.g., the spectrum occupied by the resource mapping 755 may be at least partially above 6 GHz, preferably at least partially above 75 GHz, more preferably at least partially above 30 GHz. Typically, with increasing frequencies, the aperture of an antenna decreases. Here, due to the well-defined directional transmission characteristics of the electromagnetic waves employed for the radar probing 609, a high spatial resolution may be achieved when determining the position of passive objects as part of the radar probing 609. Typically, smaller apertures can be compensated by more antennas of an antenna array. This facilitates a higher angular resolution of the radar probing.

Returning to FIG. 1, this drawing schematically illustrates an example of the radar probing 609. Here, the terminal UE1 acts as the radar transmitter. The terminal UE1 thus transmits radar probe pulses, e.g. in the second resource elements 701-703. The radar probe pulse may comprise a probing pulse section and optionally a data section encoding data that can help to implement the radar probing 609. E.g., the probing pulse section may comprise a waveform having spectral contributions arranged within the frequency associated with the respective second resource element 701-703. E.g., a duration of the probing pulse section may be in the range of 0.1-2 μs, preferably in the range of 0.8-1.2 μs. An amplitude of the waveform may be modulated; this is sometimes referred to as an envelope. The envelope may have a rectangular shape, a sinc-function shape, or any other functional dependency depending on the implementation. The duration of the probing pulse section is sometimes referred to as pulse width. The pulse width may be shorter than the duration of the respective second resource element 701-703 to enable reception of an echo of the radar probe pulse during the duration of the respective second resource element, taking into account time of travel. The optional data section may include additional information which is suited to facilitate the radar probing 609. Such information may comprise information on the radar transmitter, such as an identity; position; cell identity; virtual cell identity; etc., and/or information on the radar probe pulse itself such as a time of transmission; directional transmission profile; etc. Such information may be, generally, included explicitly or implicitly. E.g., for implicit inclusion of respective information, a lookup scheme communicated via the control channel 606 implemented on the radio channel 601 may be employed to enable inclusion of compressed flags.

Figure 2:
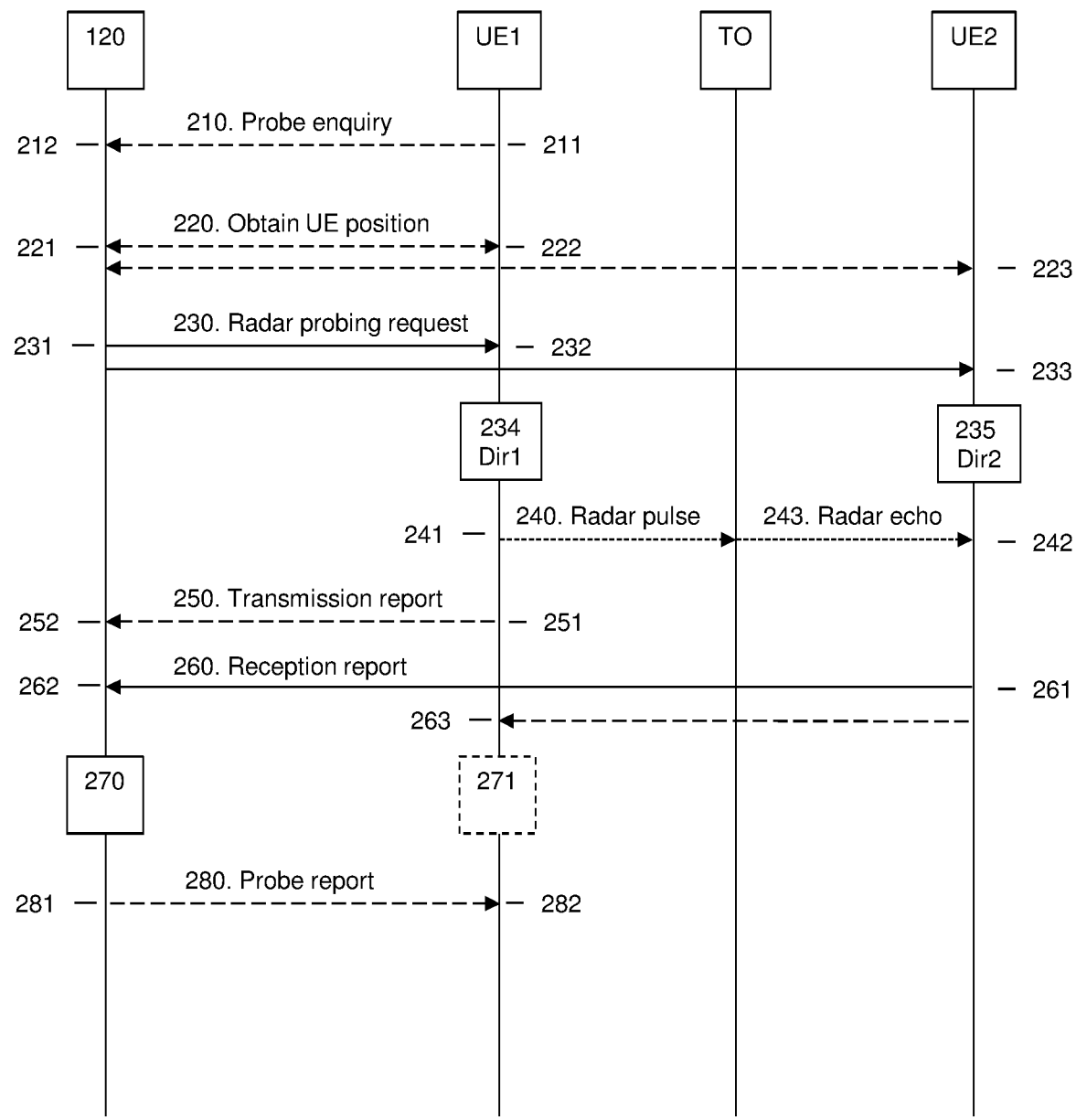
FIG. 2 schematically illustrates a signaling diagram between different entities of a system according to various embodiments, including those of FIG. 1.

FIG. 2 illustrates a signaling diagram for various embodiments, between entities of the radio communication network 100 and using the same reference numerals as in FIG. 1. To the left in the drawing, the radio device 120, including base station BS1, is shown. The base station 1 communicates with the terminals UE1 and UE2. A passive target object TO, from which transmitted radio signals are reflected or scattered, is also indicated.

The embodiments shown in FIG. 2 include the transmission of a radar probing request 230, transmitted from the radio device 120 to the terminal UE1 to act as a radar transmitter, and to the terminal UE2 configured to act as a radar receiver. The radar probing request 230 may include establishment of a radio channel 601 between the BS1 and the respective terminal UE1, UE2. Here, an attachment procedure can be executed, separately for each involved terminal UE1, UE2. Subsequently, the terminals UE1, UE2 may be operated in connected mode. The radar probing request 230 may further include, in the connected mode, transmission of a scheduling grant via the control channel 606 from the BS1 to the terminal UE1, UE2, respectively. The scheduling grant can be indicative of at least one of the resource elements 701-703 to be used for radar probing. The radar probing request 230 may thus be used in order to preemptively announce the radar probing 609, i.e., the transmission of a radar probe pulse. Here, the BS1 may act as a central scheduler for the resource elements 701-703, avoiding interference to the data communication. In some examples, the radar probing request 230 may be communicated in a unicast transmission from the BS1 to the respective terminal UE1, UE2 and optionally in further unicast transmissions to other affected devices connected to the network. In other examples, radar probing request 230 may include broadcasted transmissions on the radio channel 601. In such an embodiment, the radar probing request 230 may indicate which terminal is configured to act as transmitter UE1 and receiver UE2.

The radar probing request 230 may include a geometric identification of the radar probing, including an identification of a location for radar probing. In various embodiments, the identification of location may be defined as a location area LOC, which may be identified as one of a geographic position, a radius connected to a certain position, a geofence, or other identification of a location area. In some embodiments, identification of location may alternatively, or additionally, be defined as a direction Dir1, Dir2, such as a compass direction of probing, an angle of probing relative to a direction to a LOS direction between the BS1 and the respective UE1, UE2, or other direction identification. The radar probing request may thus include an identification of transmission direction Dir1 in control signaling to the terminal UE1, and/or an identification of detection direction Dir2 in control signaling to the terminal UE2.

The radar probing request 230 may thus convey resources for radar scan with accurate timing reference and angles or directions to scan, based on an assumed location of object to trace. The specific radar transmission resources, e.g. one or more of 701-703, may be scheduled via layer 1 signaling, e.g. downlink control information signal (DCI). Alternatively, the radar probing request may include an instruction for the terminal UE1 to transmit radar pulses with one or more certain identified beam(s).

Based on the radar probing request, the UE1 is triggered to transmit 241 one or more radar pulses 240. The UE1 may be triggered to specifically transmit 241 radar pulses 240 in a direction Dir1 obtained from the radar probing request 230, wherein radar transmission is executed in the direction of the location area LOC to be probed. The terminal UE2 is triggered to detect 242 a receive property of radio signal echoes 243 in a direction Dir2 from the radar probing request 230, wherein radar echo detection is executed in the terminal UE2 in the direction of the location area LOC to be probed. The terminal UE1 performs at least one transmission, e.g. a transmit beam sweep or using a wide beam, in the defined directions and using the scheduled resources. Further, the UE1 may also be configured to receive and listen for potential reflected signals, i.e. echoes. Each beam transmission may comprise multiple pulses/bursts in different time and/or frequency resources, such as 701-703. With the transmission of multiple bursts, a receiving terminal UE2, and possibly others including UE1, may be configured to enable receive beam sweeps for each transmit beam. The general procedure of transmission bursts may re-use the functionality from the already standardized sync signal bursts as available in 3GPP NR Release 15. This enables a receiving terminal UE2 to identify the strongest transmit beam from the transmitting terminal UE1. In turn, this may lead to a lower signal to noise ratio in the receiving terminal UE2, for detection of receive properties during radar probing. The receiving terminal UE2 may also obtain radio resource information associated with resources used by the transmitting terminal UE1, including beam information indicating for how many resources a transmit beam of radio signals will be fixed in a transmit period. Logic of the receiving terminal UE2 may further be configured to control its radio transceiver to sense the receive property in one or more receive beams, selected dependent on said beam information of the transmit beam. Specifically, the receiving terminal UE2 may determine for how many resources a strongest beam will be fixed and configure its transceiver and antenna array to detect receive properties of echoes from that beam.

The radio device may be configured to receive 262 data 260 associated with a receive property detected in at least the terminal UE2 acting as radar receiver for receiving the radar pulse. As noted, the receive property may include metric associated with one or more of time of arrival, direction of arrival, power level etc., obtained in the terminal UE2.

This may be obtained in the radio device 120 by data communication 261 from the terminal UE2 to the base station BS1 in connected mode, using radio resources 700 not employed for radar probing. Alternatively, once a sequence of radar probing is carried out, resources 701-703 allocated for radar probing may again be used for data communication, such as transmission of a report 261 of sensed receive properties to the base station BS1.

The terminal UE2 is thus configured to listen for reflections, echoes, in defined directions or beams and scheduled time frequency resources. As noted, the terminal UE2 may use multiple receive beams as a beam sweep for each of the transmit burst. This procedure is available within 3GPP specifications, e.g. for sync signal reception for NR beam management and can be reused. In 3GPP TS 38.213 the different antenna beams are denoted as antenna port quasi co-location parameters.

In some embodiments, the radar probing request 230 may be associated with power control for radar probing. In some embodiments, a power parameter such as a certain power class, or a certain Maximum Power Reduction, may be associated with radar probing. Such power parameter may be exclusively used for radar probing. In another embodiment, such a power parameter may be used also for radio communication, but additionally be assigned to radar probing. In various embodiments, the network 100, through the network node BS1, may be configured to specifically control the terminal UE1 transmit power for radar probing in accordance with the power parameter. As an example, a max Tx power limit such as a Tx power class type of limit, may be set. Additionally, or alternatively, the power parameter may include a maximum uplink duty cycle to be employed for radar probing, which is different from a maximum uplink duty cycle to be employed for data communication. In some embodiment, the power parameter(s) applied for radar probing may thus comprise a first parameter value, such as a power class or a maximum power reduction, which allows for higher output power than for data communication, and a second parameter value which allows for a smaller maximum uplink duty cycle, such as a lower percentage, than for data communication.

The power parameter(s) provided for radar probing may be predefined by specification. Alternatively, the network node 100 may convey an indication of the power parameter to the terminal UE1, e.g. in the radar probing request 230. In various embodiments, the terminal UE1 may specifically indicate a UE capability including the power parameter, such as a UE Tx power class, for its radar capability. As noted, that power class may be a different one compared to a corresponding power class for communication. By including this information in UE capability, the network 100 will have pre-conceived knowledge of which terminals are suitable for cooperating in passive radar probing. This may reduce unnecessary use of the air interface for determining suitable terminals for radar probing.

The radio device 120 may be configured to obtain position information associated with the radar transmitter UE1 and the radar receiver UE2. This may be accomplished in different ways in various embodiment. In one embodiment, terminal position information may be obtained 221 beforehand, e.g. by receiving position information from the respective terminal UE1, UE2, possibly responsive to a positioning request, or as a periodic report. This may also for basis for a decision in the radio device 120 to select terminals UE1 and UE2 to participate as transmitter and receiver in the radar probing, based on their respective position with respect to the location area LOC to probe. In some embodiments, the reception report 260 from the terminal UE2, including the sensed receive property of the radar pulse; may include or be associated with a position report comprising the position of the UE2 upon sensing the radio signal echoes. In some embodiments, a transmission report 250 may be sent from the terminal UE1 to the radio device 120, including a position report comprising the position of the UE1 upon transmitting the radar pulse. The position report from the terminal UE1 and/or the terminal UE2 may include an indication of mobility of the terminal during the radar probing, such as speed, acceleration, direction.

The radio device 120 may be configured to determine a transmit property of a radar echo 243 based on a radar pulse 240 transmitted by a first radio communication terminal UE1 acting as radar transmitter. In various embodiments, the transmit property may include signal strength, transmit beam information, transmission angle, and associated resource allocation of transmission or other information character of the transmitted radar pulse in terms of e.g. duration, employed radio resources, amplitude etc. This measurement reporting may include a new measurement with similar design as the existing "SS reference signal received quality reporting" as defined in 3GPP TS 38.215. In some embodiments, one or more of said transmit properties may be predetermined by the radio device 120, as conveyed in the radar probing request 230. In some embodiments, one or more of said transmit properties may be determined based on receiving 252 a transmit report 250 from the terminal UE1.

Based on the transmit property, the receive property and the obtained position information, the radio device 120 is configured to determine 270 a spatial property of an object TO in the target location LOC.

In various embodiments, the originator or instigator of the radar probing, having an interest of obtaining spatial property of an object TO, may be the terminal UE1, or a user thereof. In such an embodiment, a probe enquiry 210 may be transmitted 211 from the terminal UE1 to the radio device, which sets up and controls the probing process as outlined. Such an embodiment may also include transmitting 281 a probe report 280 from the radio device 120 for receipt 282 in the terminal 282, which report may include spatial property of an object TO.

In some embodiments, the probe report 280 may include the detected receive property as reported by the terminal UE2. In such an embodiment, the terminal radio device 120 may be configured to determine 271 a spatial property of an object TO in the target location LOC, based on the transmit property, the receive property and the obtained position information. In this embodiment, the step of obtaining 270 a spatial property in the radio device may be dispensed with. In such a scenario, the radio device 120 is employed for configuring radio resources in the radio communication network 100 for passive radar probing, whereas the information obtained is only processed in the originating terminal UE1.

In some embodiments, where the originator of the radar probing is the terminal UE1, that terminal UE1 may be configured to receive 263 the data 260 associated with a receive property detected in at least the terminal UE2 acting as radar receiver for receiving the radar pulse. This may be obtained by data communication from the terminal UE2 to the terminal UE1, possibly via the base station BS1 or in a side-link communication. In such an embodiment, the step of transmitting the detected receive property for receipt 262 to the radio device 120 may be dispensed with.

In some embodiments, the radio device 120 is thus employed for configuring radio resources in the radio communication network 100 for passive radar probing, whereas the information obtained is only processed in the originating terminal UE1.

In an alternative embodiment, the base station BS1 of the radio device 120 acts as the transmitting, or sounding, entity for transmitting a radar pulse, whereas the terminal UE2 and one or more further terminals are activated to receive as described above.

In one embodiment, the terminal UE2 is configured to calculate a spatial property of the object TO, based on the sensed receive property, wherein the data 260 associated with the receive property includes such calculated spatial property.

In various embodiments, the network 100 needs to determine suitable terminals to act as the receiving terminals. As one method to determine suitable terminals, such as UE2, for reception of the signal the base station BS1 of the radio device 120 may transmit a request, as multiple individual transmissions or as a broadcast, to multiple terminals to indicate their ability to potentially perform radar reception in scheduled recourses and toward a position, location or direction. This request may form part of the radar probing request 230, or alternatively be transmitted before the radar probing request 230 is actually transmitted to selected terminals for participating in the radar probing. Terminals may then determine their ability to scan toward the position LOC of interest and based on the distance from the position.

By coordinating the receiving terminals UE2 according to the synchronized time/frequency resource grid of the system and by using the position reporting from the UE2, the issues addressed in the background sections are improved.

Figure 3A:
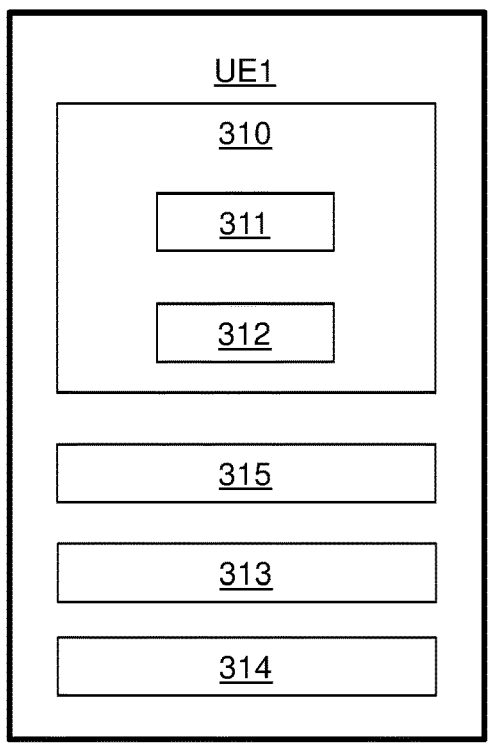
FIG. 3a schematically illustrates a radio communication terminal configured to act as a radar transmitter according to various embodiments.

FIG. 3a schematically illustrates a radio communication terminal UE1 for use in a radio communication network 100 as presented herein, and for carrying out the method steps as outlined, configured to act as a radar transmitter, and possibly a radar receiver. This embodiment is consistent with the scenario of FIG. 1 and the signaling diagram of FIG. 2.

The terminal UE1 may comprise a radio transceiver 313 for communicating with other entities of the radio communication network 100, such as the base station BS1. The transceiver 313 may thus include a radio receiver and transmitter for communicating through at least an air interface.

The terminal UE1 further comprises logic 310 configured to communicate data, via the radio transceiver, on a radio channel, to the wireless communication network 100 and/or directly with another terminal UE2, by Device-to Device (D2D) communication.

The logic 310 may include a processing device 311, including one or multiple processors, microprocessors, data processors, co-processors, and/or some other type of component that interprets and/or executes instructions and/or data. Processing device 311 may be implemented as hardware (e.g., a microprocessor, etc.) or a combination of hardware and software (e.g., a system-on-chip (SoC), an application-specific integrated circuit (ASIC), etc.). The processing device 311 may be configured to perform one or multiple operations based on an operating system and/or various applications or programs.

The logic 310 may further include memory storage 312, which may include one or multiple memories and/or one or multiple other types of storage mediums. For example, memory storage 312 may include a random access memory (RAM), a dynamic random access memory (DRAM), a cache, a read only memory (ROM), a programmable read only memory (PROM), flash memory, and/or some other type of memory. Memory storage 312 may include a hard disk (e.g., a magnetic disk, an optical disk, a magneto-optic disk, a solid state disk, etc.).

The memory storage 312 is configured for holding computer program code, which may be executed by the processing device 311, wherein the logic 310 is configured to control the terminal UE1 to carry out any of the method steps as provided herein. Software defined by said computer program code may include an application or a program that provides a function and/or a process. The software may include device firmware, an operating system (OS), or a variety of applications that may execute in the logic 310.

The terminal UE1 may further comprise an array 314, which may include an antenna array. The logic 310 may further be configured to control the radio transceiver to employ an anisotropic sensitivity profile of the antenna array to transmit radio signals in a particular transmit direction. The terminal UE1 may further comprise a positioning unit 315, configured to determine a position of the terminal UE1. The positioning unit 315 may be a GPS receiver. Obviously, the terminal may include other features and elements than those shown in the drawing or described herein, such as a power supply, a casing, a user interface etc.

Figure 3B:
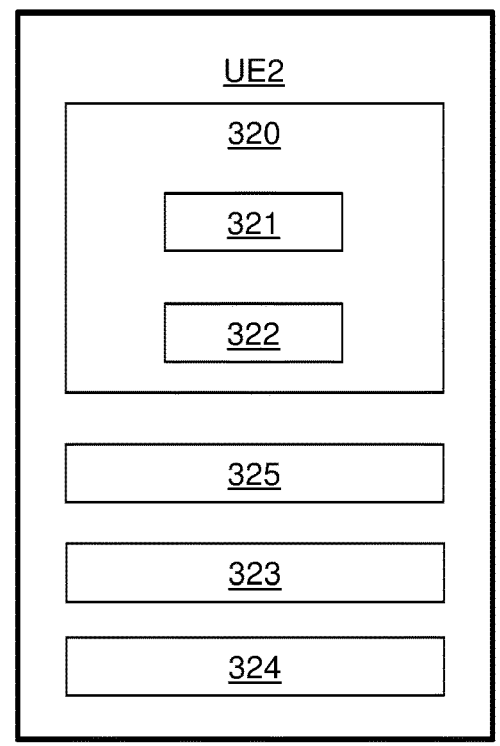
FIG. 3b schematically illustrates a radio communication terminal configured to act as a radar receiver according to various embodiments.

FIG. 3b schematically illustrates a radio communication terminal UE2 for use in a radio communication network 100 as presented herein, and for carrying out the method steps as outlined, configured to act as a radar receiver. This embodiment is consistent with the scenario of FIG. 1 and the signaling diagram of FIG. 2.

The terminal UE2 may comprise a radio transceiver 323 for communicating with other entities of the radio communication network 100, such as the base station BS1. The transceiver 323 may thus include a radio receiver and transmitter for communicating through at least an air interface.

The terminal UE2 further comprises logic 320 configured to communicate data, via the radio transceiver, on a radio channel, to the wireless communication network 100 and/or directly with another terminal UE1, by Device-to Device (D2D) communication.

The logic 320 may include a processing device 321, including one or multiple processors, microprocessors, data processors, co-processors, and/or some other type of component that interprets and/or executes instructions and/or data. Processing device 321 may be implemented as hardware (e.g., a microprocessor, etc.) or a combination of hardware and software (e.g., a system-on-chip (SoC), an application-specific integrated circuit (ASIC), etc.). The processing device 321 may be configured to perform one or multiple operations based on an operating system and/or various applications or programs.

The logic 320 may further include memory storage 322, which may include one or multiple memories and/or one or multiple other types of storage mediums. For example, memory storage 322 may include a random access memory (RAM), a dynamic random access memory (DRAM), a cache, a read only memory (ROM), a programmable read only memory (PROM), flash memory, and/or some other type of memory. Memory storage 322 may include a hard disk (e.g., a magnetic disk, an optical disk, a magneto-optic disk, a solid state disk, etc.).

The memory storage 322 is configured for holding computer program code, which may be executed by the processing device 321, wherein the logic 320 is configured to control the terminal UE2 to carry out any of the method steps as provided herein. Software defined by said computer program code may include an application or a program that provides a function and/or a process. The software may include device firmware, an operating system (OS), or a variety of applications that may execute in the logic 320.

The terminal UE2 may further comprise an antenna 324, which may include an antenna array. The logic 320 may further be configured to control the radio transceiver to employ an anisotropic sensitivity profile of the antenna array to receive radio signals in a particular receive direction. The terminal UE2 may further comprise a positioning unit 325, configured to determine a position of the terminal UE2. The positioning unit 325 may be a GPS receiver. Obviously, the terminal may include other features and elements than those shown in the drawing or described herein, such as a power supply, a casing, a user interface etc.

Figure 4:
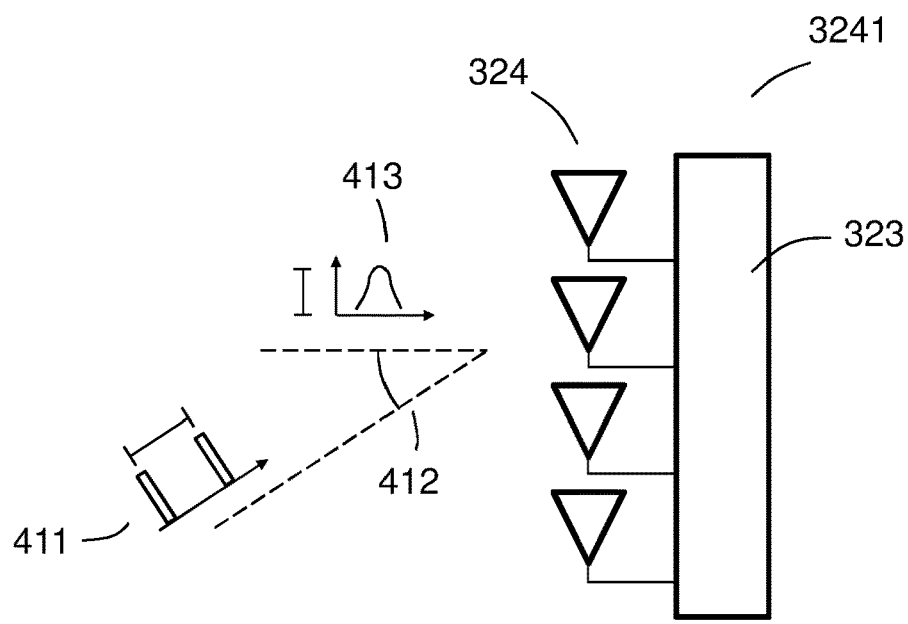
FIG. 4 schematically illustrates receive properties of radar probe pulses received by an antenna array of a radio transceiver according to various embodiments.

FIG. 4 schematically illustrates a transceiver arrangement 3241 of a terminal UE2 in one embodiment. It may be noted that a corresponding arrangement may be employed in a transmitting terminal UE1. The transceiver arrangement 3214 comprises an antenna array 324 in the illustrated example, connected to the transceiver 323. Based on the antenna array 324, it is possible to employ an anisotropic sensitivity profile during reception, e.g., of an echo 243 of a radar probe pulse 240. E.g., in some examples, it is possible that the accuracy of the radar probing 609 is further increased by employing an anisotropic sensitivity profile of the antenna array 324 of the radio transceiver arrangement 3241. Such anisotropic sensitivity profile of the antenna array 324 may be combined with an isotropic directional transmission profile or and anisotropic directional transmission profile of the respective radar probe pulse 240.

In the example of FIG. 4, the transceiver arrangement 3241 comprises a single antenna array 324. In further examples, it is possible that the transceiver arrangement 3241 comprises a plurality of antenna arrays 324, which may further be oriented differently to cover different directions with respect to the UE2.

FIG. 4 furthermore schematically illustrates receive properties such as the receive power level 413, the angle of arrival 412, and the time-of-flight 411. Further receive properties of interest regarding the radar probing 609 include the Doppler shift which may be used in order to determine a velocity of the object TO, e.g., the radial velocity from/to the radar transmitter and/or radar receiver. The angle of arrival 412 may e.g. be determined in absolute terms, e.g., with respect to a magnetic North direction provided by a separate compass (not shown), etc. It is also possible that the angle of arrival 412 is determined in relative terms, e.g., with respect to a characteristic direction of the antenna array 324. Depending on the definition of the angle of arrival 412 and/or the further receive properties, corresponding information may be included in a respective report message 260. A possible further receive property is the phase shift, e.g., with respect to an arbitrary reference phase or a reference phase defined with respect to a line-of-sight transmission.

In one embodiment, the radio communication terminal UE2 may be configured to act as a radar receiver, and comprise the radio transceiver 323 and the logic 320, wherein the logic is configured to communicate data, via the radio transceiver, on a radio channel 101. The logic may further be configured to
- obtain 233, via the radio transceiver, a radar probing request 230 to detect radio signal echoes;
- determine 235 a receive direction Dir2 based on the request;
- control the radio transceiver to detect 242 a receive property of the radio signal echoes in said direction; and
- transmit 261, via the radio transceiver, data 260 associated with the detected receive property to a radio communication device BS1, UE1.

By configuring the terminal UE2 to determine 235 a receive direction Dir2 based on the request, more effective radar probing may be obtained since the UE2 may be pre-disposed to sense in a particular direction.

In some embodiments, the terminal UE2 comprises the antenna array 324, wherein the logic 320 is configured to control the radio transceiver to employ an anisotropic sensitivity profile of the antenna array to detect radio signals according to said receive direction.

In some embodiments, the radar probing request 230 indicates a target location LOC to probe. The target location LOC may be identified by a geometric definition. In some embodiments, the target location is defined by a direction, e.g. said receive direction. In some embodiments, the target location LOC is defined by position information, wherein the logic is configured to determine the receive direction based on the position data of the target location and position data of the terminal UE2 itself. The terminal UE2 may further comprise one or more sensors to determine its rotational position, such as a compass. The logic may further be configured to control the radio transceiver to sense the receive property in one or more receive beams 302, configured dependent on said location. An anisotropic sensitivity profile may e.g. be implemented by controlling which receive beams to use in the terminal UE2.

Both the sounding device, i.e. a terminal UE1 or the base station BS1, and the detecting terminal UE2, are synchronized with the network 100 and resources 701-703 have been granted for radar probing. In association with the radar probing request 230, the terminal UE2 receives information on a schedule for transmit beams to be used from the sounding device UE1 or BS1. The radar probing request 230 may thus include radio resource information for the radio signals from which echoes are to be detected.

In some embodiments, the radio resource information includes beam information indicating for how many resources a transmit beam 301 of said radio signals will be fixed in a transmit period. That is, it is made clear to the terminal UE2 for how many resources the transmit beam 301 would be kept fixed. In one embodiment, the logic is thereby configured to control the radio transceiver to sense the receive property in one or more receive beams 302, selected dependent on said beam information of the transmit beam 301. As an example, if the transmit beam 301 is fixed for T resources, the logic 320 may configure the antenna array 324 with N receive beams in the UE2, where N<=T. By providing information on the transmit beam(s) 301 and the associated resources to the receiver UE2, the UE2 may autonomously decide upon how many receive beams 302 to use. This is advantageous, since UE2 is the one best fit to determine how well it can beamform towards the assumed position LOC.

Figure 5:
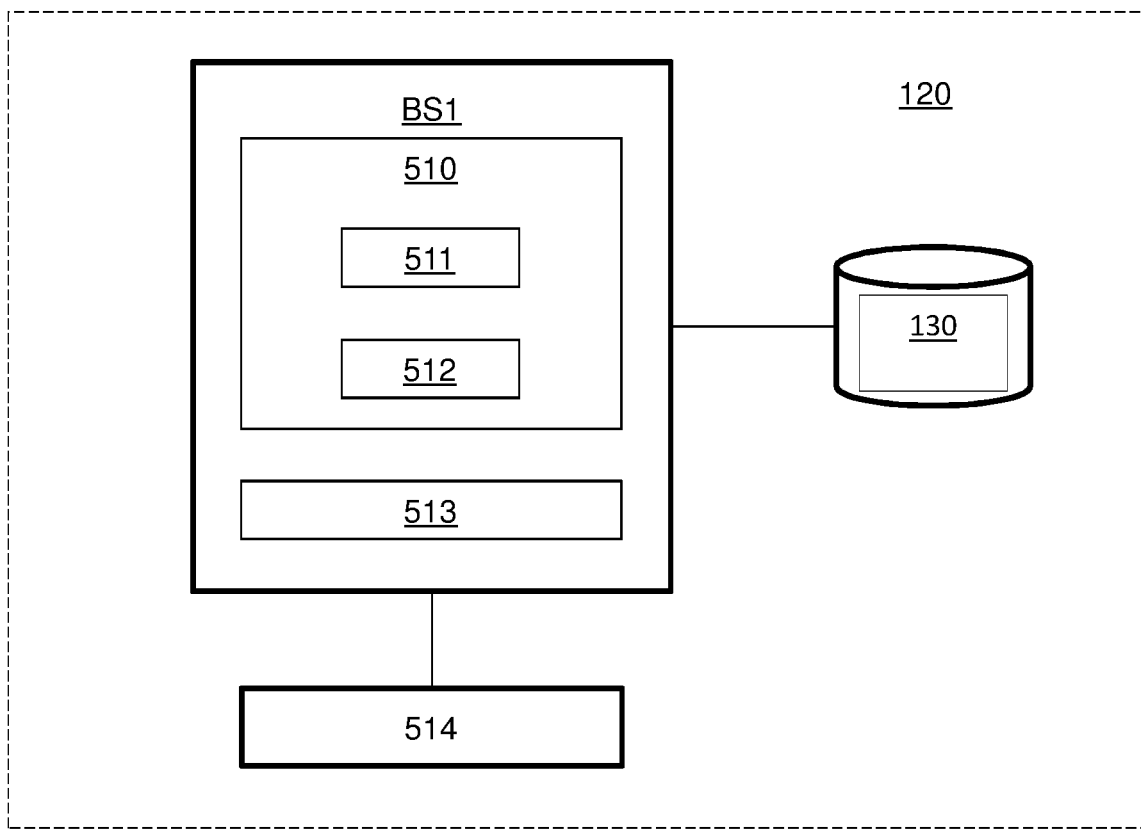
FIG. 5 schematically illustrates a radio communication device configured to act as a control entity for passive radar probing according to various embodiments.

FIG. 5 schematically illustrates a radio device 120 for use in a radio communication network 100 as presented herein, and for carrying out the method steps as outlined for controlling radar probing using one or more terminals UE2, UE1. This embodiment is consistent with the scenario of FIG. 1 and the signaling diagram of FIG. 2. The radio device 120 includes a base station BS1 of a radio communication network 100, such as agNodeB. The radio device 120 may further comprise a computing node 130, such as an edge computing node configured to carry out computation tasks for terminals connected to the network. The base station BS1 may comprise a radio transceiver 513 for communicating with other entities of the radio communication network 100, such as the terminals UE1, UE2. The transceiver 513 may thus include a radio receiver and transmitter for communicating through at least an air interface.

The base station BS1 further comprises logic 510 configured to communicate data, via the radio transceiver, on a radio channel, with terminals UE1, UE2. The logic 510 may include a processing device 511, including one or multiple processors, microprocessors, data processors, co-processors, and/or some other type of component that interprets and/or executes instructions and/or data. Processing device 511 may be implemented as hardware (e.g., a microprocessor, etc.) or a combination of hardware and software (e.g., a system-on-chip (SoC), an application-specific integrated circuit (ASIC), etc.). The processing device 511 may be configured to perform one or multiple operations based on an operating system and/or various applications or programs.

The logic 510 may further include memory storage 512, which may include one or multiple memories and/or one or multiple other types of storage mediums. For example, memory storage 512 may include a random access memory (RAM), a dynamic random access memory (DRAM), a cache, a read only memory (ROM), a programmable read only memory (PROM), flash memory, and/or some other type of memory. Memory storage 512 may include a hard disk (e.g., a magnetic disk, an optical disk, a magneto-optic disk, a solid state disk, etc.).

The memory storage 512 is configured for holding computer program code, which may be executed by the processing device 511, wherein the logic 510 is configured to control the radio device 120 to carry out any of the method steps as provided herein. Software defined by said computer program code may include an application or a program that provides a function and/or a process. The software may include device firmware, an operating system (OS), or a variety of applications that may execute in the logic 510.

The radio device 120 may further comprise an antenna 514 connected to the radio transceiver 513, which antenna may include an antenna array. The logic 510 may further be configured to control the radio transceiver to employ an anisotropic sensitivity profile of the antenna array to transmit and/or receive radio signals in a particular transmit direction.

In various embodiment, the radio communication device 120, including the base station BS1, is configured to control passive radar probing in a radio communication network 100 and comprises the radio transceiver 513 and the logic 510 configured to communicate data via the radio transceiver. In various embodiments, the logic is configured to
- transmit 231, via the radio transceiver, a radar probing request 230, wherein said radar probing request includes an identification of a location LOC, Dir1, Dir2 for radar probing, wherein said identification of the location includes a geometric definition;
- determine 231, 252 a transmit property of a radar pulse 240 transmitted by a first radio device UE1, 120 acting as radar transmitter;
- receive 262, via the radio transceiver, data 260 associated with a receive property detected in at least one radio communication terminal UE2 acting as radar receiver for receiving the radar pulse;
- obtain 221, 252, 262 position information associated with the radar transmitter and the radar receiver;
- determine 270 a spatial property of an object TO in said location based on the transmit property, the receive property and the obtained position information.

By providing identification of a location for radar probing to the communication terminal UE2 configured to act as a radar receiver, the terminal UE2 is configuring to determine 235 a receive direction Dir2 based on the request. This way, more effective radar probing may be obtained since the UE2 may be pre-disposed to sense in a particular direction.

In one embodiment, the identification of the location includes geographic coordinate data.

In one embodiment, the identification of the location includes an identification of an angle of probing Dir1, Dir2 associated with an identified radio communication terminal as the radar transmitter UE1 and/or radar receiver UE2.

In one embodiment, the radar probing request includes an identification of a said radio communication terminal UE2 to act as radar receiver.

In one embodiment, the radar probing request includes an identification of a further radio communication terminal UE1 to act as radar transmitter.

In one embodiment, the logic is configured to receive 252, from the transmitter radio communication terminal UE1 and via the radio transceiver, data 250 associated with said transmit property.

In one embodiment, said request identifies a resource element (761, 763) of a radio signal to be used for the radar pulse (240).

In various embodiments outlined herein, advantageous effects are obtained by reusing beam management functionalities for burst transmissions and Tx+Rx beam sweeping and beam reporting functionalities that have been included into the 3GPP specifications for New Radio (NR). Such beam management functionalities for burst transmissions and beam reporting can be reused for example by a network node requesting via a signaling message, e.g. in an radio resource control message or a downlink control signaling message, a UE to transmit radar pulses, where the signaling message is indicative of that the so-called sounding reference signaling (SRS) mechanism as specified in 3GPP for the new radio technology, and e.g. described in 38.802 technical report. According to a procedure such as a sounding reference signaling mechanism in new radio technology a UE directionally broadcasts SRSs, which may be allocated resources in a mm Wave band, in varying directions over time that may via the varying directions of the SRS transmissions results in a continuous sweep in angular space. For the beam reporting functionality, in the beam management functionalities in 3GPP new radio, each potential receiver such as a gNB or a radio terminal UE2 may scan its angular directions as well, monitoring the strength of the received SRSs and building a report table based on the channel quality of each receiving direction, to capture the dynamics of the channel. It can be understood that there are advantageous effects of this transmission method since such mechanism can be beneficial for the radar pulse transmission to cover an angular direction area. The additional functionality can therefore be included in 3GPP with relatively small additions to the specifications. The signaling described in the steps above could be included in RRC signaling (RRC configuration and RRC measurement request/response) while the synchronization and resource allocations for physical layer resources could be achieved via downlink control information (DCI).

The invention claimed is:

1. A radio communication terminal configured to act as a radar receiver, comprising: —a radio transceiver, —logic configured to communicate data, via the radio transceiver, on a radio channel, wherein the logic is further configured to obtain, via the radio transceiver, a radar probing request to detect radio signal echoes, wherein said radio signal echoes originate from a radio communication device and are reflected off a target object to be positioned by the radar signal echoes; determine a receive direction to the target object based on the radar probing request; control the radio transceiver to detect a receive property of the radio signal echoes in said direction; and transmit, via the radio transceiver, data associated with the detected receive property to the radio communication device.

2. The radio communication terminal of claim 1, comprising—an antenna array, wherein the logic is configured to control the radio transceiver to employ an anisotropic sensitivity profile of the antenna array to detect radio signals according to said receive direction.

3. The radio communication terminal of claim 2, wherein the radar probing request indicates a target location to probe; wherein the logic is configured to control the radio transceiver to sense the receive property in one or more receive beams, configured dependent on said location.

4. The radio communication terminal of claim 2, wherein the radar probing request includes radio resource information for the radio signals from which echoes are to be detected.

5. The radio communication terminal of claim 4, wherein said radio resource information includes beam information indicating for how many resources a transmit beam of said radio signals will be fixed in a transmit period.

6. The radio communication terminal of claim 5, wherein the logic is configured to control the radio transceiver to sense the receive property in one or more receive beams, selected dependent on said beam information of the transmit beam.

7. The radio communication terminal of claim 1, wherein the receive property is selected from the group comprising: relative or absolute angle of arrival; time of flight; Doppler shift; phase shift; and receive power level.

8. The radio communication terminal of claim 1, comprising—a positioning unit configured to determine a position of the terminal, wherein the logic is configured to determine said receive direction based on the determined position of the terminal and a target location identification obtained in said request.

9. The radio communication terminal of claim 1, wherein the logic is configured to communicate data with the radio communication device employing a first resource element of the radio channel.

10. A radio communication device, comprising: —a radio transceiver, —logic configured to communicate data via the radio transceiver, wherein the logic is configured to transmit, via the radio transceiver, a radar probing request, wherein said radar probing request includes an identification of a location for radar probing; determine a transmit property of a radar pulse transmitted towards said location by a radio device acting as a radar transmitter; receive, via the radio transceiver, data associated with a receive property of a radar signal echo of the radar pulse as reflected off an object, which radar signal echo is detected in at least one radio communication terminal acting as a radar receiver; obtain position information associated with the radar transmitter and the radar receiver; determine a spatial property of the object in said location based on the transmit property, the receive property and the obtained position information.

11. The radio communication device of claim 10, wherein the identification of the location includes geographic coordinate data.

12. The radio communication device of claim 10, wherein the identification of the location includes an identification of an angle of probing associated with an identified radio communication terminal of the radar transmitter and/or radar receiver.

13. The radio communication device of claim 10, wherein the radar probing request includes an identification of a further radio communication terminal to act as radar transmitter.

14. The radio communication device of claim 10, wherein the logic is configured to receive, from the radio communication terminal acting as radar transmitter and via the radio transceiver, data associated with said transmit property.

15. The radio communication device of claim 10, wherein said request identifies a resource element of a radio signal to be used for the radar pulse.

* * * * *